(12) United States Patent
Matsushita

(10) Patent No.: US 6,225,853 B1
(45) Date of Patent: *May 1, 2001

(54) BOOSTER CIRCUIT

(75) Inventor: Yuichi Matsushita, Miyazaki (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,999

(22) Filed: Apr. 7, 1998

Related U.S. Application Data

(62) Division of application No. 08/637,621, filed on Apr. 29, 1996, now Pat. No. 5,877,650.

(30) Foreign Application Priority Data

Sep. 6, 1994 (JP) ................................... 6-212260

(51) Int. Cl.[7] ........................................ G05F 1/10
(52) U.S. Cl. ........................ 327/536; 327/589; 363/60
(58) Field of Search ....................... 327/536, 537, 327/538, 543, 589; 363/59, 60

(56) References Cited

U.S. PATENT DOCUMENTS

| | | | |
|---|---|---|---|
| 3,942,047 | 3/1976 | Buchanan | 307/297 |
| 4,621,315 | 11/1986 | Vaughn et al. | 363/60 |
| 4,920,280 | 4/1990 | Cho et al. | 307/296.2 |
| 5,010,259 | 4/1991 | Inoue et al. | 307/482 |
| 5,140,182 | * 8/1992 | Ichimura | 327/536 |
| 5,180,928 | 1/1993 | Choi | 307/296.6 |

(List continued on next page.)

FOREIGN PATENT DOCUMENTS

| | | |
|---|---|---|
| 2632 199A1 | 1/1978 | (DE). |
| 0 539 110 A1 | 4/1993 | (EP). |
| 2 261 307 | 12/1993 | (GB). |
| 2-38118 | 3/1977 | (JP). |
| 60-234354 | 11/1985 | (JP). |
| 63-69455 | 3/1988 | (JP). |
| 1-93919 | 4/1989 | (JP). |
| 1-273417 | 11/1989 | (JP). |
| 2-234460 | 9/1990 | (JP). |
| 4-340759 | 11/1992 | (JP). |
| 5-103463 | 4/1993 | (JP). |
| 6-45528 | 2/1994 | (JP). |
| 06060653 | 3/1994 | (JP). |
| 6-60652 | 3/1994 | (JP). |

*Primary Examiner*—Jung Ho Kim
(74) *Attorney, Agent, or Firm*—Venable; Robert J. Frank; Allen Wood

(57) ABSTRACT

A booster circuit uses a source voltage to generate a boosted voltage that is higher than the source voltage. The booster circuit has two capacitors. The two capacitors are alternately charged and discharged in response to a signal applied to an input terminal. The first capacitor is discharged to boost a voltage at the boosting node, whereas the second capacitor is discharged to boost the voltage at an output terminal. Further, the booster circuit includes a control circuit. When the voltage at the input terminal changes from an "H" level to an "L" level, the control circuit supplies a voltage for discharging the first capacitor to the first capacitor after the second capacitor has been brought into a charging state. Since the voltage at the output terminal is reduced by the charging of the second capacitor, a transistor is deactivated in response to the voltage at the output terminal. As a result, the boosting node and the source voltage can be prevented from being coupled by the transistor. The voltage at the boosting node is boosted by the discharge of the first capacitor, and the output terminal and the source voltage are coupled by a transistor that is activated in response to the boosted voltage at the boosting node. It is thus possible to increase the voltage at the output terminal to the source voltage $V_{CC}$.

8 Claims, 2 Drawing Sheets

U.S. PATENT DOCUMENTS

| | | | |
|---|---|---|---|
| 5,196,996 | 3/1993 | Oh | 363/60 |
| 5,202,588 | 4/1993 | Matsuo et al. | 307/296.2 |
| 5,267,201 | 11/1993 | Foss et al. | 365/189.09 |
| 5,367,489 | 11/1994 | Park et al. | 365/189.11 |
| 5,408,140 | 4/1995 | Kawai et al. | 327/536 |
| 5,521,871 * | 5/1996 | Choi | 327/536 |
| 5,589,793 * | 12/1996 | Kassapian | 327/536 |
| 5,677,645 * | 10/1997 | Merritt | 327/536 |
| 5,721,509 | 2/1998 | Taft et al. | 327/536 |
| 5,734,290 * | 3/1998 | Chang et al. | 327/536 |
| 5,757,228 * | 5/1998 | Furutani et al. | 327/536 |
| 5,901,055 | 5/1999 | Yi et al. | 363/60 |

* cited by examiner

BOOSTER CIRCUIT

CROSS-REFERENCE TO RELATED APPLICATION

This application is a division of U.S. application Ser. No. 08/637,621, filed Apr. 29, 1996, U.S. Pat. No. 5,877,650 which was the National Stage of International Application number PCT/JP95/01770, filed Sep. 6, 1995. The disclosure of the parent application is incorporated herein by reference.

BACKGROUND OF THE INVENTION

A dynamic random access memory or the like needs an inner circuit to increase or boost a source voltage. In order to reliably read data written into a memory cell, for example, a word line needs to be boosted. With a change of the source voltage from 5V to 3.3V, the source voltage needs to be boosted by the inner circuit. A booster circuit is used to cope with such a case. The booster circuit generates a voltage (hereinafter called a "boosted voltage") higher than the source voltage based on the source voltage.

The booster circuit must generate a boosted voltage that is stable even with a reduction in the source voltage. Further, a booster circuit for generating a stable boosted voltage using a reduced source voltage tends to be complex. A booster circuit having a simple circuit configuration a would be desirable to reduce the chip area.

SUMMARY OF THE INVENTION

An object of the present invention is to provide a booster circuit for generating a boosted voltage that is stable even with a reduction in the source voltage.

Another object of the present invention is to provide a booster circuit having a simple circuit configuration.

According to one aspect of the present invention, for achieving the above objects, there is provided a booster circuit for generating a boosted voltage higher than a source voltage, based on the source voltage, comprising an input terminal capable of being set to a first voltage and a second voltage, an output terminal, a boosting node capable of being set to the boosted voltage, a first conducting circuit for bringing the output terminal and a power voltage source into conduction in response to a voltage applied to the boosting node, a second conducting circuit for bringing the boosting node and the power voltage source into conduction in response to a voltage applied to the output terminal, a first capacitor circuit connected between the input terminal and the output terminal, which is discharged in response to the second voltage set to the input terminal and charged based on the voltage applied to the output terminal in response to the first voltage set to the input terminal, a control circuit connected to the input terminal, for supplying a third voltage in response to the second voltage set to the input terminal and supplying a fourth voltage in response to the first voltage set to the input terminal after the first capacitor circuit has been charged, and a second capacitor circuit connected between the control circuit and the boosting node, which is discharged in response to the fourth voltage outputted from the control circuit and charged based on the voltage at the boosting node in response to the third voltage outputted from the control circuit.

According to another aspect of the present invention, there is provided a booster circuit for generating a boosted voltage higher than a source voltage, based on the source voltage, comprising an input terminal capable of being set to a first voltage and a second voltage, an output terminal, a boosting node capable of being set to the boosted voltage, a first conducting circuit for bringing the output terminal and a power voltage source into conduction in response to a voltage applied to the boosting node, a first diode circuit connected between the output terminal and the boosting node so as to be in the forward direction with respect to the boosting node, a first capacitor circuit connected between the input terminal and the output terminal, which is discharged in response to the second voltage set to the input terminal and charged based on a voltage applied to the output terminal in response to the first voltage set to the input terminal, a second capacitor circuit connected between the input terminal and the boosting node, which is discharged in response to the first voltage set to the input terminal and charged based on the voltage set to the boosting node in response to the second voltage set to the input terminal, and a clamping circuit connected to the output terminal, for reducing the voltage of the output terminal when the voltage thereof has reached a predetermined voltage or more.

DETAILED DESCRIPTION OF THE PREFERRED EMBODIMENTS

Booster circuits according to preferred embodiments of the present invention will hereinafter be described with reference to the accompanying drawings.

Figure 1:
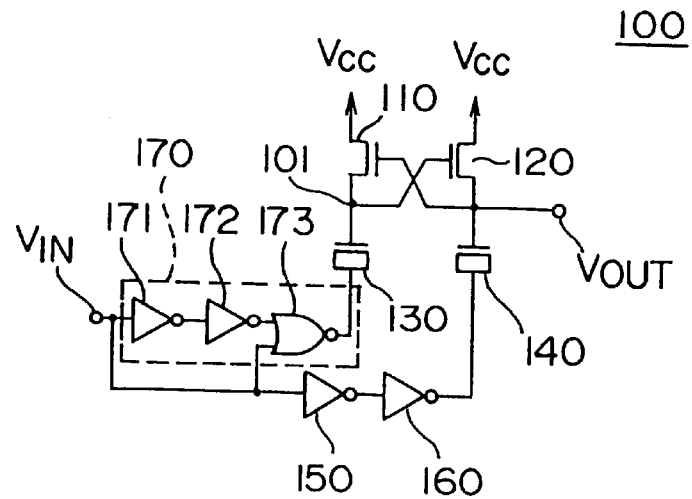
FIG. 1 is a circuit diagram of a booster circuit in accordance with a first embodiment of the present invention.

FIG. 1 is a circuit diagram of a booster circuit 100 in accordance with a first embodiment of the present invention.

The booster circuit 100 shown in FIG. 1 comprises two cross-connected transistors 110 and 120, two MOS capacitors (hereinafter called simply "capacitors") 130 and 140, two inverters 150 and 160 and a control circuit 170.

The transistors 110 and 120 are N-type MOS transistors. The drains of both of the transistors 110 and 120, which serve as first electrodes, are electrically connected to a power voltage source for supplying a source voltage $V_{CC}$ thereto. The source of the transistor 110, which serves as a second electrode, and the gate of the transistor 120, which serves as a control electrode, are both electrically connected to a node 101. The source of the transistor 120, which serves as a second electrode, and the gate of the transistor 110, which serves as a control gate, are both electrically connected to an output terminal $V_{OUT}$.

The gate of the capacitor 130, which serves as a first electrode, is electrically connected to the node 101. The gate of the capacitor 140, which serves as a first electrode, is electrically connected to the output terminal $V_{OUT}$.

The input of the inverter 150 is electrically connected to an input terminal $V_{IN}$, whereas the output thereof is electrically connected to the input of the inverter 160. The output of the inverter 160 is electrically connected to the source and drain of the capacitor 140, each of which serves as a second electrode.

The input of the control circuit 170 is electrically connected to the input terminal $V_{IN}$, whereas the output thereof is electrically connected to the source and drain of the capacitor 130, each of which serves as a second electrode.

The control circuit 170 comprises two inverters 171 and 172 and a NOR circuit 173. The input of the inverter 171 is electrically connected to the input terminal $V_{IN}$, whereas the output thereof is electrically connected to the input of the inverter 172. The inputs of the NOR circuit 173 are respectively electrically connected to the output of the inverter 172 and the input terminal $V_{IN}$. The output of the NOR circuit 1 73 is electrically connected to the second electrode of the capacitor 130. The inverters 171 and 172 are identical in delay time to the inverters 150 and 160. The delay time caused by the NOR circuit 173 is identical to or slightly shorter than the delay time caused by each of the inverters 150 and 160.

The control circuit 170 generates an output which has either a low-voltage level (hereinafter called the "L" level) on a high-voltage level (hereinafter called the "H" level) the outlet of control circuit 170 is delayed a given amount with respect to the output of the inverter 160, which also has either the "H" level or the "L" level.

Figure 2:
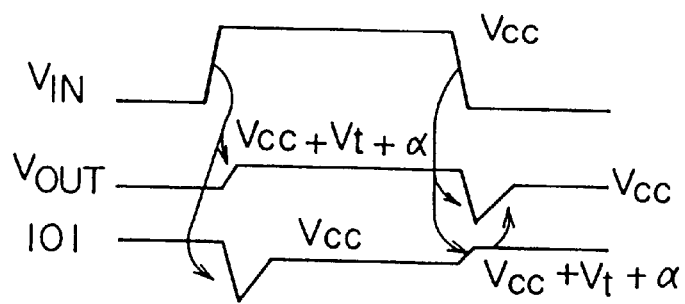
FIG. 2 is a timing chart for describing the operation of the booster circuit shown in FIG. 1.

The operation of the booster circuit 100 constructed as described above will now be described with reference to a timing chart shown in FIG. 2.

When the booster circuit 100 is in its initial state, the voltage at the input terminal $V_{IN}$ has the "L" level. Therefore, the voltage outputted from the inverter 160 has the "L" level and a voltage outputted from the control circuit 170 has the "H" level. Consequently, the capacitor 130 is discharged to boost or increase the voltage at the node 101, which has been precharged to the source voltage $V_{CC}$, up to a voltage of $V_{CC}+V_t+\alpha$ (where $V_t$ represents the threshold voltage of each of the transistors 110 and 120). Thus, since the voltage supplied to the control electrode of the transistor 120 is $V_{CC}+V_t+\alpha$, the transistor 120 is activated to supply the source voltage $V_{CC}$ to the output terminal $V_{OUT}$ as it is. At this time, the capacitor 140 is charged based on the voltage at the output terminal $V_{OUT}$. The transistor 110 is deactivated because the control electrode and the first electrode thereof are supplied with the source voltage $V_{CC}$ and the second electrode thereof is supplied with the voltage $V_{CC}+V_t+\alpha$.

Next, the voltage applied to the input terminal $V_{IN}$ changes from the "L" level to the "H" level. Therefore, the voltage outputted from the inverter 160 is brought to the "H" level and the voltage outputted from the control circuit 170 is brought to the "L" level. Thus, the capacitor 130 is charged based on the voltage at the node 101. Further, the capacitor 140 is discharged to increase or boost the voltage at the output terminal $V_{OUT}$ to the voltage $V_{CC}+V_t+\alpha$. At this time, the voltage at the node 101 is reduced to a voltage of less than $V_{CC}-V_t$ under the charge of the capacitor 130. Since, however, the control electrode of the transistor 110 is supplied with the boosted voltage of the output terminal $V_{OUT}$, the transistor 110 is activated. Therefore, the voltage at the node 101 can be raised up to the source voltage $V_{CC}$.

Next, the voltage applied to the input terminal $V_{IN}$ changes from the "H" level to the "L" level. Therefore, the output voltage of the inverter 160 is brought to the "L" level. Thus, the capacitor 140 is charged in accordance with the voltage at the output terminal $V_{OUT}$. Owing to this charging operation, the voltage at the output terminal $V_{OUT}$ is reduced to a voltage of less than the source voltage $V_{CC}$. Correspondingly, the transistor 110 is deactivated. Now, the voltage outputted from the NOR circuit 173 in the control circuit 170 changes from the "L" level to the "H" level after the voltage inputted to the input terminal $V_{IN}$ has been delayed by the inverters 171 and 172 in the control circuit 170. Namely, the voltage outputted from the control circuit 170 is changed after the output voltage of the inverter 160 has been changed. The capacitor 130 is discharged owing to the change in the output voltage of the control circuit 170. Therefore, the voltage at the node 101 is boosted up to the voltage $V_{CC}+V_t+\alpha$. The transistor 120 is activated in response to the boosted voltage at the node 101. Thus, the voltage at the output terminal $V_{OUT}$ is raised to the source voltage $V_{CC}$. Since, at this time, the control electrode and the first electrode of the transistor 110 are supplied with the source voltage $V_{CC}$ and the second electrode thereof is supplied with the voltage $V_{CC}+V_t+\alpha$, the transistor 110 remains inactive.

Now, the lowering of the voltage level of the output terminal $V_{OUT}$ by the capacitor 140 changes the output voltage of the control circuit 170 after deactivation of the transistor 110. By doing so, an electric charge corresponding to the boosted voltage at the node 101 can be prevented from escaping into the source voltage $V_{CC}$ through the transistor 110.

As described above, the booster circuit 100 shown in FIG. 1 sets the voltage at the node 101 to the source voltage $V_{CC}$ in advance in response to the voltage at the output terminal $V_{OUT}$. Thus, the voltage level at the node 101 can be ensured even in the case of a source voltage lower than 5V. As a result, the voltage at the output terminal $V_{OUT}$ can be set to the source voltage $V_{CC}$ in advance. It is therefore possible to reliably set the output terminal $V_{OUT}$ to the boosted voltage. Further, since the voltage at the node 101 is brought to the source voltage $V_{CC}$ in advance in response to the voltage at the output terminal $V_{OUT}$, the booster circuit 100 is simple in circuit configuration.

A second embodiment of the present invention will now be described with reference to the accompanying drawings.

Figure 3:
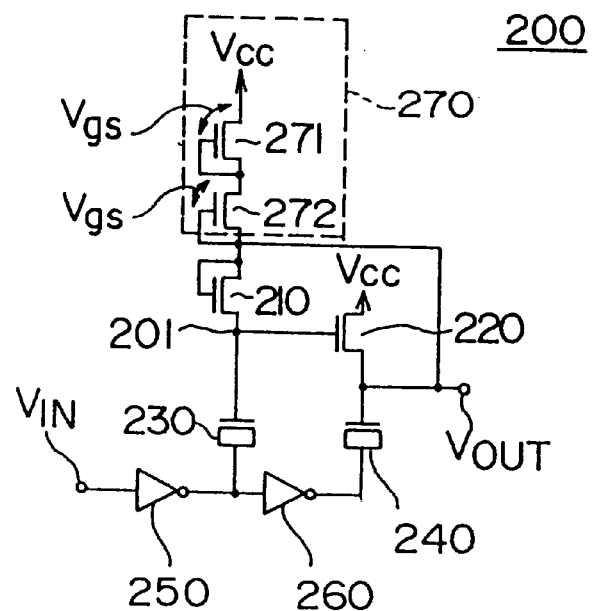
FIG. 3 is a circuit diagram of a booster circuit in accordance with a second embodiment of the present invention.

FIG. 3 is a circuit diagram of a booster circuit 200 in accordance with the second embodiment of the present invention.

The booster circuit 200 shown in FIG. 3 comprises two transistors 210 and 220, two MOS capacitors 230 and 240, two inverters 250 and 260 and a clamping circuit 270. The transistors 210 and 220 are N-type MOS transistors. The drain of the transistor 210, which serves as a first electrode, is electrically connected to the gate of thereof, which serves as a control electrode. The source of the transistor 210, which serves as a second electrode, is electrically connected to a node 201. Namely, the transistor 210 serves as a diode forward-connected in the direction of the node 201. The first electrode of the transistor 210 is also electrically connected to an output terminal $V_{OUT}$. The drain of the transistor 220, which serves as a first electrode, is electrically connected to a power voltage source for supplying a source voltage $V_{CC}$. The source of the transistor 220, which serves as a second electrode, is electrically connected to the output terminal $V_{OUT}$. The gate of the transistor 220, which serves as a control electrode, is electrically connected to the node 201.

The gate of the capacitor 230, which serves as a first electrode, is electrically connected to the node 201. The gate of the capacitor 240, which serves as a first electrode, is electrically connected to the output terminal $V_{OUT}$.

The input of the inverter 250 is electrically coupled to an input terminal $V_{IN}$, whereas the output thereof is electrically connected to the source and drain of the capacitor 230 each of which serves as a second electrode. The input of the inverter 260 is electrically connected to the second electrode of the capacitor 230, whereas the output thereof is electrically connected to the source and drain of the capacitor 240 each of which serves as a second electrode.

The clamping circuit 270 is electrically connected to the first electrode of the transistor 210. The clamping circuit 270 comprises two transistors 271 and 272. The transistors 271 and 272 are both N-type MOS transistors. The source of the transistor 271, which serves as a second electrode, is electrically connected to the power voltage source for supplying the source voltage $V_{CC}$. The drain of the transistor 271, which serves as a first electrode, and the gate thereof, which serves as a control electrode, are both electrically connected to the source of the transistor 272, which serves as a second electrode. The drain of the transistor 272, which serves as a first electrode, and the gate thereof, which serves as a control electrode, are both 10 electrically connected to the first electrode of the transistor 210. Namely, each of the transistors 271 and 272 acts as a diode forward-connected in the direction of the power voltage source.

In other words, the clamping circuit 270 maintains the voltage of the output terminal $V_{OUT}$ at a voltage of less than a predetermined voltage.

Figure 4:
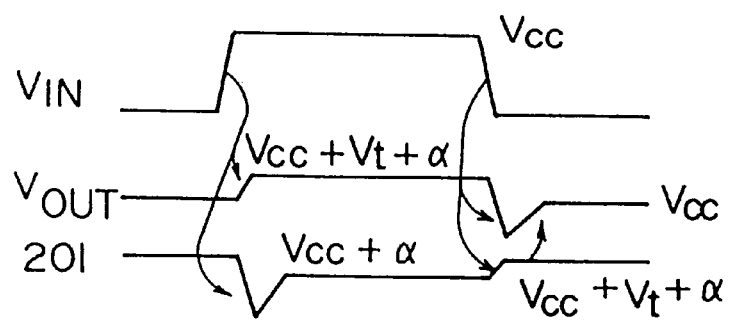
FIG. 4 is a timing chart for describing the operation of the booster circuit shown in FIG. 3.

The operation of the booster circuit 200 constructed as described above will now be described with reference to a timing chart shown in FIG. 4.

When the clamping circuit 200 is in its initial state, the voltage at the input terminal $V_{IN}$ is at the "L" level. Therefore, the voltage outputted from the inverter 250 is at the "H" level and the voltage outputted from the inverter 260 is at the "L" level. Consequently, the capacitor 230 is discharged to increase or boost the voltage at the node 201, which has been precharged to the source voltage $V_{CC}$, up to a voltage of $V_{CC}+V_t+\alpha$ (where $V_t$ represents the threshold voltage of the transistor 220). Thus, since the voltage supplied to the control electrode of the transistor 220 is $V_{CC}+V_t+\alpha$, the transistor 220 is activated to supply the source voltage $V_{CC}$ to the output terminal $V_{OUT}$ as it is. At this time, the capacitor 240 is charged based on the voltage applied to the output terminal $V_{OUT}$. Since the control electrode and the first electrode of the transistor 210 are supplied with the source voltage $V_{CC}$ and the second electrode thereof is supplied with the voltage of $V_{CC}+V_t+\alpha$, the transistor 210 is not activated.

Next, the voltage at the input terminal $V_{IN}$ changes from the "L" level to the "H" level. Therefore, the output voltage of the inverter 250 is changed to the "L" level and the output voltage of the inverter 260 is changed to the "H" level. Thus, the capacitor 230 is charged based on the voltage at the node 201 and the capacitor 240 is discharged. Owing to the discharge of the capacitor 240, the voltage at the output terminal $V_{OUT}$ is boosted to the voltage of $V_{CC}+V_t+\alpha$. Further, the voltage at the node 201 is lowered to a voltage of less than $V_{CC}-V_t$ owing to the charging of the capacitor 230. However, the first electrode and control electrode of the transistor 210 are supplied with the boosted voltage of the output terminal $V_{OUT}$ so that the transistor 210 is activated. Therefore, the voltage at the node 201 can be raised to a voltage of $V_{CC}+\alpha$ corresponding to a voltage reduced by the threshold voltage $V_t$ of the transistor 210 from the voltage at the output terminal $V_{OUT}$. Since the control electrode, first electrode and second electrode of the transistor 220 are supplied with the source voltage $V_{CC}$, the voltage of $V_{CC}+\alpha$ and the voltage of $V_{CC}+V_t+\alpha$ respectively, the transistor 220 is brought into an inactive state.

Next, the voltage applied to the input terminal $V_{IN}$ changes from the "H" level to the "L" level. Therefore, the output voltage of the inverter 250 is changed to the "H" level and the output voltage of the inverter 260 is changed to the "L" level. Thus, the capacitor 230 is discharged and the capacitor 240 is charged in accordance with the voltage at the output terminal $V_{OUT}$. Owing to the discharge of the capacitor 230, the voltage at the node 201 is boosted from $V_{CC}+\alpha$ to $V_{CC}+V_t+\alpha$. Further, the voltage at the output terminal $V_{OUT}$ is reduced to a voltage of less than $V_{CC}$ owing to the charging of the capacitor 240. Since, however, the control electrode of the transistor 220 is supplied with the boosted voltage of the node 201, the transistor 220 is activated. Therefore, the voltage at the output terminal $V_{OUT}$ can be raised to the source voltage $V_{CC}$.

The operation of the clamping circuit 200 will now be described in detail.

Now consider that the boosted voltage of the output terminal $V_{OUT}$ is brought to a voltage of $V_{CC}+2V_t$ or more, for example. At this time, each of voltages $V_{gs}$ between the control electrode (gate) and first electrode (source) of the transistor 271 and between the control electrode (gate) and first electrode (source) of the transistor 272 is brought to the threshold voltage $V_t$ or more. Therefore, the transistors 271 and 272 are both activated. Owing to the activation of the transistors 271 and 272, the output terminal $V_{OUT}$ and the source voltage $V_{CC}$ are electrically coupled. Thus, since current flows from the output terminal $V_{OUT}$ to the source voltage $V_{CC}$, the voltage at the output terminal $V_{OUT}$ reaches the voltage of $V_{CC}+V_t+\alpha$, reduced from the voltage of $V_{CC}+2V_t$. Correspondingly, the voltage at the node 201 also changes from a voltage of $V_{CC}+V_t$ (i.e., $V_{CC}+2V_t-V_t$) to a voltage of $V_{CC}+\alpha$. Since, at this time, the transistor 220 is in an deactivated state, an electric charge at the output terminal $V_{OUT}$ is prevented from escaping into the source voltage $V_{CC}$ through the transistor 220.

As described above, the booster circuit 200 shown in FIG. 3 sets the voltage at the node 201 to the source voltage $V_{CC}+\alpha$ in advance in response to the voltage at the output terminal $V_{OUT}$. Thus, the voltage level at the node 201 can be ensured even in the case of a source voltage lower than 5V. Further, the voltage level at the node 201 can be boosted from the voltage level of the source voltage $V_{CC}$ or more. As a result, the voltage at the node 201 can be reliably boosted as compared with the booster circuit 100 shown in FIG. 1. Further, the clamping circuit 270 is simple in circuit configuration as compared with the control circuit 170 of the booster circuit 100 shown in FIG. 1.

The preferred embodiments have been described above in detail. However, the booster circuit of the present invention is not necessarily limited to the configurations of the two embodiments referred to above. Various changes can be made to them. The transistor 210 shown in FIG. 3 may be a PN-junction diode, for example. Further, the transistors 110 and 120 shown in FIG. 1 and the transistor 210 shown in FIG. 3 may be bipolar transistors. The circuit configuration of the control circuit 170 shown in FIG. 1 may be different if it is operated in a manner similar to the control circuit 170. The number of the series-connected inverters 171 and 172 and the number of the series-connected inverters 150 and 160 may not be two so long as the number is even. Further, the number of the diode-connected transistors in the clamping circuit 270 shown in FIG. 3 may not be two. The number of the transistors may be set according to the upper limit of the voltage applied to the output terminal $V_{OUT}$.

What is claimed is:

1. A booster circuit for use with a power source to generate a boosted voltage that is higher than a source voltage supplied by the power source, comprising:

an input terminal for receiving an input signal having a first voltage level or a second voltage level;

an output terminal;

a boosting node;

a first conducting circuit for selectively coupling said output terminal and the power source in response to a voltage applied to said boosting node;

a first diode circuit connected between said output terminal and said boosting node so as to be in the forward direction with respect to said boosting node;

a first capacitor coupled between said input terminal and said output terminal, said first capacitor being charged in response to the first voltage level of said input signal and being boosted in response to the second voltage level of said input signal;

a second capacitor coupled between said input terminal and said boosted node, said second capacitor being charged in response to the second voltage level of said input signal and being boosted in response to the first voltage level of said input signal; and a clamping circuit coupled between said output terminal and said power source, said clamping circuit electrically coupling said output terminal with said power source when the voltage thereof has reached a predetermined voltage or more.

2. A booster circuit according to claim 1, wherein said first and second capacitors are composed of MOS capacitors.

3. A booster circuit according to claim 1, wherein said clamping circuit comprises a second diode circuit which is connected to the power source, said second diode circuit being connected in the forward direction with respect to the power source, and a third diode circuit which is connected between said second diode circuit and said output terminal, said third diode circuit being connected in the forward direction with respect to said second diode circuit.

4. A booster circuit according to claim 3, wherein said first, second and third diode circuits comprise N-type MOS transitors.

5. A booster circuit according to claim 3, wherein said clamping circuit is activated when the voltage of said output terminal becomes greater than the source voltage of the power source plus the sum of threshold voltages of said second and third diode circuits.

6. A booster circuit according to claim 1, further including a first inverter connected between said first capacitor and said second capacitor and a second inverter connected between said first inverter and said input terminal.

7. A booster circuit for use with a power source, comprising:

an output terminal;

a transistor connected between the output terminal and the power source, the transistor having a gate;

first means for turning the transistor ON and OFF in response to a digital input signal, the first means including a first capacitor which has a terminal that is connected to the gate of the transistor and which also has another terminal, a clamping circuit which is connected between the power source and the output terminal, a diode which is connected between the gate of the transistor and the output terminal, and means for applying a digitally high voltage level to the another terminal of the first capacitor during a period when the transistor is ON, the means for applying a digitally high voltage level to the another terminal of the first capacitor including an inverter which receives the input signal and which has an output that is connected to the another terminal of the first capacitor; and second means for generating a boosted voltage at the output terminal, the second means including a second capacitor which has a terminal that is connected to the output terminal and which also has another terminal, and means for applying a digitally high voltage level to the another terminal of the second capacitor during a period when the transistor is OFF.

8. A booster circuit in accordance with claim 7, wherein the second means comprises an inverter connected between the another terminal of the first capacitor and the another terminal of the second capacitor.

* * * * *